United States Patent [19]

Christianson et al.

[11] Patent Number: 5,461,525
[45] Date of Patent: Oct. 24, 1995

[54] LOAD BEAM HAVING AREAS OF VARYING THICKNESS IN THE SPRING REGION FORMED BY VARYING NUMBERS OF LAMINA

[75] Inventors: Mark Christianson, Hutchinson; Brent Lien, Minneapolis; James Mahoney; David Ziegler, both of Hutchinson, all of Minn.

[73] Assignee: Hutchinson Technology Incorporated, Hutchinson, Minn.

[21] Appl. No.: 49,971

[22] Filed: Apr. 20, 1993

Related U.S. Application Data

[63] Continuation-in-part of Ser. No. 583,048, Sep. 14, 1990, abandoned, Ser. No. 706,868, May 29, 1991, abandoned, and Ser. No. 808,406, Dec. 16, 1991, abandoned.

[51] Int. Cl.⁶ .............................. G11B 5/48; G11B 21/21
[52] U.S. Cl. .............................................. 360/104
[58] Field of Search ................................. 360/103–106

[56] References Cited

U.S. PATENT DOCUMENTS

| | | | |
|---|---|---|---|
| 3,668,668 | 6/1972 | Rubitschet | 360/103 |
| 3,906,326 | 9/1975 | Chur | 360/106 |
| 4,012,779 | 3/1977 | Brunner | 360/106 |
| 4,268,879 | 5/1981 | Watrous | 360/104 |
| 4,286,297 | 8/1981 | Root et al. | 360/103 |
| 4,616,279 | 10/1986 | Poorman | 360/103 |
| 4,639,863 | 1/1987 | Harrison et al. | 360/98.01 |
| 4,645,280 | 2/1987 | Gordon et al. | 360/104 |
| 4,670,804 | 6/1987 | Kant | 360/102 |
| 4,724,500 | 2/1988 | Dalziel | 360/103 |
| 4,734,805 | 3/1988 | Yamada et al. | 360/104 |
| 4,757,402 | 7/1988 | Mo | 360/103 |
| 4,764,829 | 8/1988 | Makino | 360/106 |
| 4,791,502 | 12/1988 | Tronsano | 360/106 |
| 4,796,122 | 1/1989 | Levy et al. | 360/106 |
| 4,797,763 | 1/1989 | Levy et al. | 360/104 |
| 4,819,094 | 4/1989 | Oberg | 360/104 |
| 4,843,502 | 6/1989 | Tagawa | 360/105 |
| 4,853,811 | 8/1989 | Brooks et al. | 360/103 |

(List continued on next page.)

FOREIGN PATENT DOCUMENTS

| | | | |
|---|---|---|---|
| 59-213066 | 12/1984 | Japan | 360/104 |
| 61-192081 | 8/1986 | Japan | 360/104 |
| 63-878 | 1/1988 | Japan | 360/104 |
| 63-144475 | 6/1988 | Japan | 360/104 |
| 63-225981 | 1/1989 | Japan . | |
| 3-216877 | 9/1991 | Japan | 360/104 |

OTHER PUBLICATIONS

Hutchinson Technology, "Type 16 Suspension Product Summary", Jul. 1991.

*Primary Examiner*—Stuart S. Levy
*Assistant Examiner*—Jefferson Evans
*Attorney, Agent, or Firm*—Faegre & Benson

[57] ABSTRACT

A magnetic head suspension for attachment to a rigid arm comprises a spring load beam element and a flexure means joined to the distal end of the load beam element for supporting a read/write head. The spring load beam element portion is formed from material generally having a first thickness. The load beam has a central region in the spring region which has a second thickness, generally thinner than the first thickness. The second thickness may be formed by the partial or complete removal of load beam material in the central region. First thickness legs bounding the central region may be formed to be of widest width at the location proximal to the rigid section of the load beam, of medium width at the location distal to the rigid section of the load beam, and of narrowest width between the two ends of each leg, thus providing a load beam of good lateral stiffness and spring rate characteristics. Other types of areas may be formed by varying partial or complete removal of load beam material in the central region. Provision of such areas of reduced thickness in the spring region reduces the load beam spring rate, increases load beam spring natural frequency and the sway mode frequency, and provides a load beam spring area with minimum stress.

2 Claims, 4 Drawing Sheets

U.S. PATENT DOCUMENTS

| | | | |
|---|---|---|---|
| 4,853,812 | 8/1989 | Daito et al. | 360/104 |
| 4,868,694 | 9/1989 | Hagan | 360/104 |
| 4,894,740 | 1/1990 | Chhabra et al. | 360/103 |
| 4,896,233 | 1/1990 | Yamada | 360/106 |
| 4,943,875 | 7/1990 | Reidenbach et al. | 360/104 |
| 4,947,275 | 8/1990 | Hinlein | 360/104 |
| 4,954,919 | 9/1990 | Yamada | 360/104 |
| 4,965,684 | 10/1990 | Stefansky | 360/78.12 |
| 4,972,279 | 11/1990 | Atesmen et al. | 360/103 |
| 4,972,280 | 11/1990 | Iwata | 360/104 |
| 4,991,045 | 2/1991 | Oberg | 360/104 |
| 4,992,898 | 2/1991 | Wanlass | 360/104 |
| 4,994,931 | 2/1991 | Foote | 360/104 |
| 4,996,616 | 2/1991 | Aoyagi et al. | 360/104 |
| 4,998,174 | 3/1991 | Wada et al. | 360/103 |
| 5,001,583 | 3/1991 | Matsuzaki | 360/104 |
| 5,003,420 | 3/1991 | Hinlein | 360/104 |
| 5,006,946 | 4/1991 | Matsuzaki | 360/104 |
| 5,012,368 | 4/1991 | Bosier et al. | 360/104 |
| 5,012,369 | 4/1991 | Owe et al. | 360/104 |
| 5,014,144 | 5/1991 | Sato et al. | 360/104 |
| 5,019,931 | 5/1991 | Ohwe et al. | 360/104 |
| 5,027,241 | 6/1991 | Hatch et al. | 360/105 |
| 5,057,953 | 10/1991 | Wanlass | 360/104 |
| 5,079,660 | 1/1992 | Yumura et al. | 360/104 |
| 5,081,553 | 1/1992 | Wanlass et al. | 360/103 |
| 5,126,904 | 6/1992 | Sakurai | 360/104 |
| 5,184,265 | 2/1993 | Foote et al. | 360/106 |
| 5,185,683 | 2/1993 | Oberg et al. | 360/104 |
| 5,198,945 | 3/1993 | Blaeser et al. | 360/104 |
| 5,268,805 | 12/1993 | Perg et al. | 360/104 |

LOAD BEAM HAVING AREAS OF VARYING THICKNESS IN THE SPRING REGION FORMED BY VARYING NUMBERS OF LAMINA

CROSS-REFERENCE TO RELATED APPLICATIONS

This application is a continuation-in-part of commonly assigned application Ser. No. 07/583,048, filed Sep. 14, 1990, entitled IMPROVED REVERSE RAIL HEAD SUSPENSION, now abandoned in favor of Ser. No. 08/050,517, filed Apr. 20, 1993, and of commonly assigned application Ser. No. 07/706,868, filed May 29, 1991, entitled LOW PROFILE HEAD DISK ASSEMBLY, now abandoned in favor of Ser. No. 08/073,778, filed Jun. 8, 1993, abandoned in favor of Ser. No. 08/398,128, filed Mar. 3, 1995 and of commonly assigned co-pending application Ser. No. 07/808,406, filed Dec. 16, 1991, entitled CARRIER STRIP HEAD INTERCONNECT ASSEMBLY abandoned in favor of Ser. No. 08/243,538, filed May 16, 1994, now U.S. Pat. No. 5,391,842, issued Feb. 21, 1995.

BACKGROUND OF THE INVENTION

The present invention relates generally to the field of load producing springs for disk drive heads. More specifically, the invention relates to an improved spring design for providing a consistent load.

As is known in a disk drive, a magnetic head for reading and writing information on the disk is typically mounted on one end of a load beam spring. The other end of the load beam spring is attached to an actuator arm that positions the spring and head over a selected track on the disk.

A conventional load beam spring comprises a thin, usually triangular shaped metal piece having a spring area and a stiffened area. The stiffened area includes formed ribs or flanges along the perimeter and is intended to provide length without flexibility or compliance. Such springs are intended to provide a consistent load as well as low stiffness, so that any misalignment does not cause a significant change in the load.

The spring rate of such load beam springs is typically measured as a load change due to a vertical deflection at the read/write head and is commonly 60–100 grams per inch. Thus, disk drive assembly tolerances that cause misalignment result in load changes which cause the spacing of the read/write head to change with respect to the disk. If the read/write head moves too close to the disk, damage could result to either the head or the disk, and if the read/write head moves away from the disk, information may not pass between the head and disk. Lowering the load beam spring rate is therefore critical.

Common methods for reducing load beam spring rates are to use thinner metal. Additionally, it is known to cut a square hole from the center of the spring area. However, these methods for reducing the spring rate also lower the load beam spring natural frequencies of vibration which will cause read/write head positioning instabilities. Such positioning errors will restrict the information flow between the head and the disk.

The previously mentioned methods for reducing the spring rate may also have a detrimental effect on the stability of the spring. Both reducing the spring thickness and taking metal away from the center of the spring reduce the cross-section in a manner that increases the stress in the load beam spring. Therefore, during handling and loading/unloading procedures, the load beam spring may be damaged, resulting in a load change on the read/write head. The load change on the read/write head will cause the head to damage the disk or move away from the disk, causing information transfer problems.

As read/write heads and disks continue to decrease in size, head to disk spacing becomes even more critical. At the same time, positioning requirements continue to demand higher load beam spring natural frequencies. Therefore, there is a need for an improved load beam spring area that minimizes spring rate, increases load beam natural frequencies, and minimizes the stress in the load beam spring.

SUMMARY OF THE INVENTION

Therefore, it is an object of the present invention to reduce the load beam spring rate.

Another object is to provide an increased load beam spring natural frequency and specifically the sway mode frequency, which resembles lateral bending coupled with torsion.

Another object is to provide a load beam spring area with minimum stress, so that the load change is minimized.

To achieve these and other objects in accordance with the purpose of the present invention, a load beam spring is provided with varied width dimensions and optimized fillets (that is, rounded off interior angles). The major width of the spring area is either increased at both ends or at least the width adjoining the stiffened load beam portion is increased. Such width increases increase the load beam sway mode natural frequency.

The present invention provides a magnetic head suspension for attachment to a rigid arm which comprises a spring load beam element and a flexure joined to the load beam element adjacent the load beam distal end to support a read/write head mounted on the flexure. The spring load beam element is formed from material generally having a first thickness.

The load beam element also has a central region in the spring region which has a second thickness, generally less than the first thickness. This reduction of thickness is formed by removal of load beam material in the spring region and serves to reduce the spring rate. Although the removal of material in general would lower the load beam spring natural frequency, using the reduction in material in combination with a major width increase actually increases the sway mode natural frequency. The spring region may be oriented to define two supporting legs of the first thickness, with the legs extending across the spring region at the perimeter of the load beam in the direction of the load beam longitudinal axis, such that the spring region now becomes in effect two beams. In addition, each leg may be formed to be wider at its proximal and distal locations, preferably with each leg being widest at its distal location (adjacent the stiffened load beam) and slightly narrower at its proximal location (adjacent the base plate). Each leg may further be formed with a narrowest center region (that is, narrower than either the proximal or the distal widths) and provide a load beam of good lateral stiffness and spring rate characteristics.

The second thickness region may be produced by partially etching the material, or by a stamping or coining operation, or by other commonly known material removal processes. The "second thickness" may also be formed of areas of differing thicknesses, each of which is substantially less than the first thickness. The first and second thicknesses may alternatively be formed by different numbers of laminar sheets.

The varied widths of the spring region legs, along with optimized fillets, distribute the stress in the spring evenly when the spring is loaded. By distributing the stress evenly, the peak stress is minimized and thus damage to the spring is minimized.

The aforementioned objectives as well as other objectives of the present invention will become apparent with reference to the drawings, the description of the embodiments, and the claims.

DETAILED DESCRIPTION OF THE INVENTION

Figure 1:
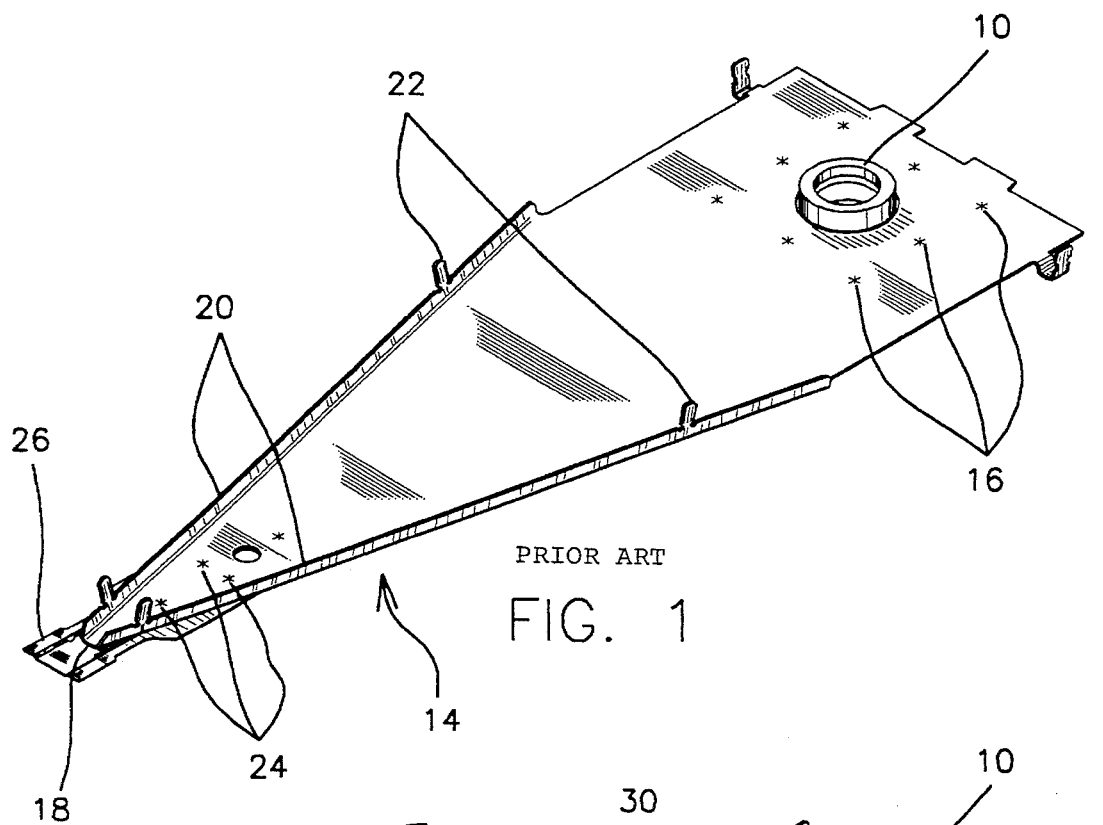
FIG. 1 is a prior art triangular shaped load beam with no cutouts.

Referring now to the drawings, FIG. 1 illustrates a prior art magnetic head suspension assembly. Generally, the magnetic head suspension assembly of the present invention is utilized in applications calling for suspension systems known in the industry as the Watrous type suspension systems, as generally described in U.S. Pat. Nos. 3,931,641 and 4,167,765. The detailed descriptions of the structure and use of Watrous suspension systems and disk drives utilizing them contained in these two patents are incorporated into the present application by reference.

The suspension as shown in FIG. 1 is mounted on a rigid arm of an actuator or magnetic disk drive utilizing swaging boss 10 which projects upwardly from base plate which is positioned beneath the bottom planar surface of the proximal end of load beam element 14 and welded thereto by a series of welds 16 which secure base plate to the bottom surface of load beam 14. A swaged connection of load beam 14 to a rigid arm, which may be part of an assembly of rigid arms referred to as an E-block, is well-known in the industry and is not described further herein. Alternatively, other base plate structures can be used which provide for securing the load beam to the mounting arm utilizing screws, welding, bonding, or any other suitable connecting means.

As shown in FIG. 1, prior art load beam element 14 is typically formed from a sheet of stainless steel, preferably a hard or 300 series alloy, having a nominal sheet thickness between 0.002 and 0.004 inches. Beam element 14 has top and bottom planar surfaces which have a width at the proximal end, adjacent the actuator arm, which is approximately equal to the width of the arm, and then tapers to a second, lesser width at distal apex 18. Beam element 14 is resilient at its proximal end, adjacent to base plate, but is substantially rigid for its remaining length. The rigidity is enhanced by providing upwardly or downwardly oriented stiffening flanges 20. In FIG. 1, stiffening flanges 20 project upwardly from beam element 14. Stiffening flanges 20 also include wire capture flanges or wire guides 22.

A typical load, a magnetic head (not shown), is mounted at and below distal apex 18 of load beam 14 on flexure piece 26, which is affixed thereto by welds 24 which join it to the surface of load beam 14.

Figure 2:
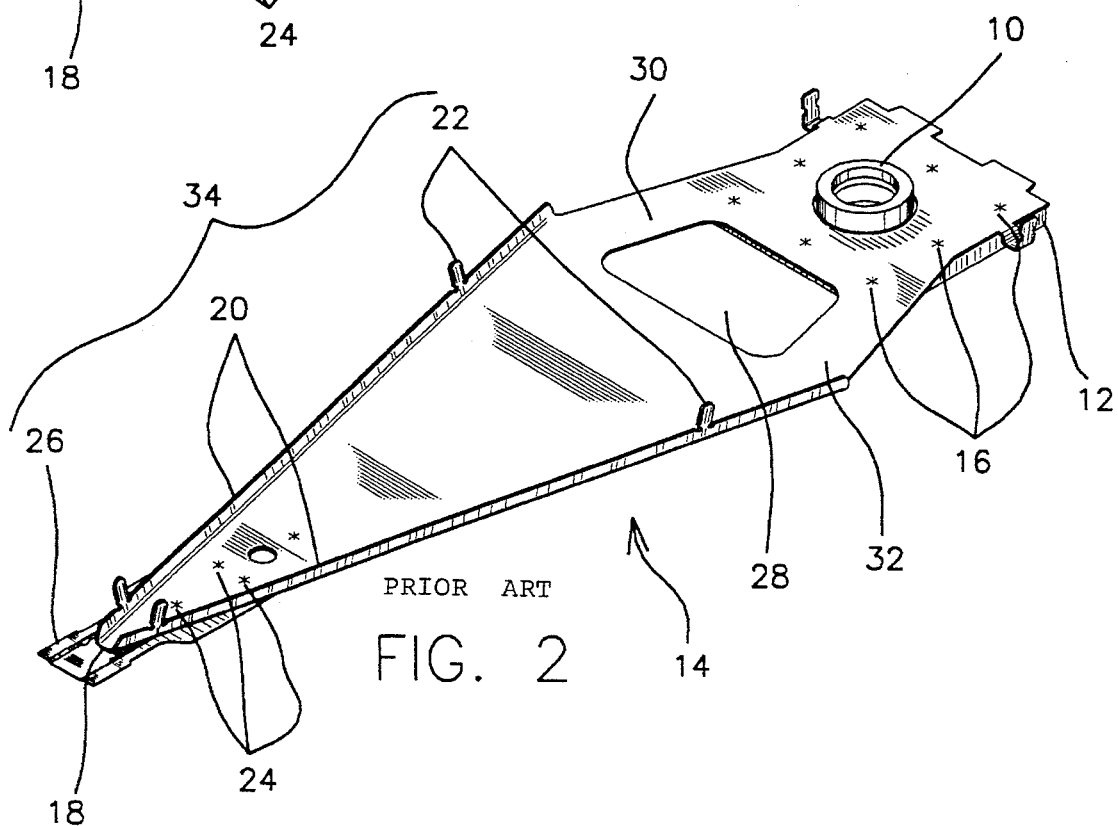
FIG. 2 is a prior art spring area with a cutout defining two constant width beams enclosing the cutout. Also, the major width of the proximal end of the load beam is larger than the major width at the distal end.

A modified version of a prior art load beam 14 is shown in FIG. 2, with similar items identified with the same reference characters as used in FIG. 1. FIG. 2 differs from the structure in FIG. 1 by the provision of trapezoidal cutout 28, which is positioned near the proximal end of load beam 14 between the portion of load beam 14 adjacent base plate 12 and the portion of load beam 14 stiffened by side flanges 20. As can be seen in FIG. 2, trapezoidal cutout 28 defines a pair of spring regions 30, 32 which suspend stiffened part 34 of load beam 14 from the portion attached to the actuator arm.

Figure 3:
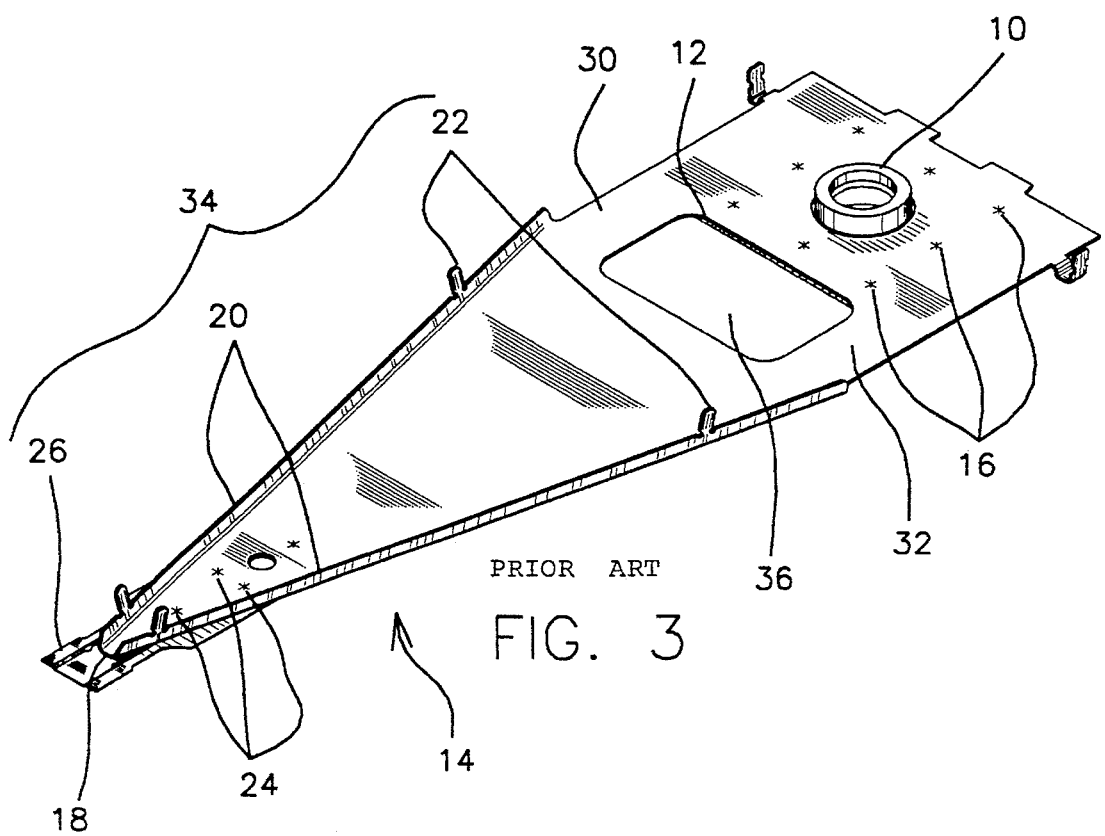
FIG. 3 is a prior art spring area with a rectangular shaped cutout. The two beams (legs) are each of a constant width. Also, the major width of the proximal end of each leg is equal to the major width of the distal end of each leg.

The assembly shown in FIG. 3 is another variant of the prior art, which has rectangular cutout 36 in the resilient region of load beam 14 which defines a pair of parallel equal-width springs 30, 32 supporting stiffened portion 34 of the flange-reinforced or stiffened portion of load beam 14 from the mounting area which is attached to the actuator.

In both of the prior art embodiments shown in FIGS. 2 and 3, spring arms 30, 32 which define the minor sides of trapezoidal cutout 28 or rectangular cutout 36 are parallel. In FIG. 2, the width of the load beam tapers from a maximum width at the point of transition between side springs 30, 32 and stiffened portion 34 to a lesser width toward the proximal end of the load beam, where the load beam is attached to base plate 12. In the embodiment of the prior art shown in FIG. 3, the width of the resilient portion of the load beam is constant.

Figure 4:
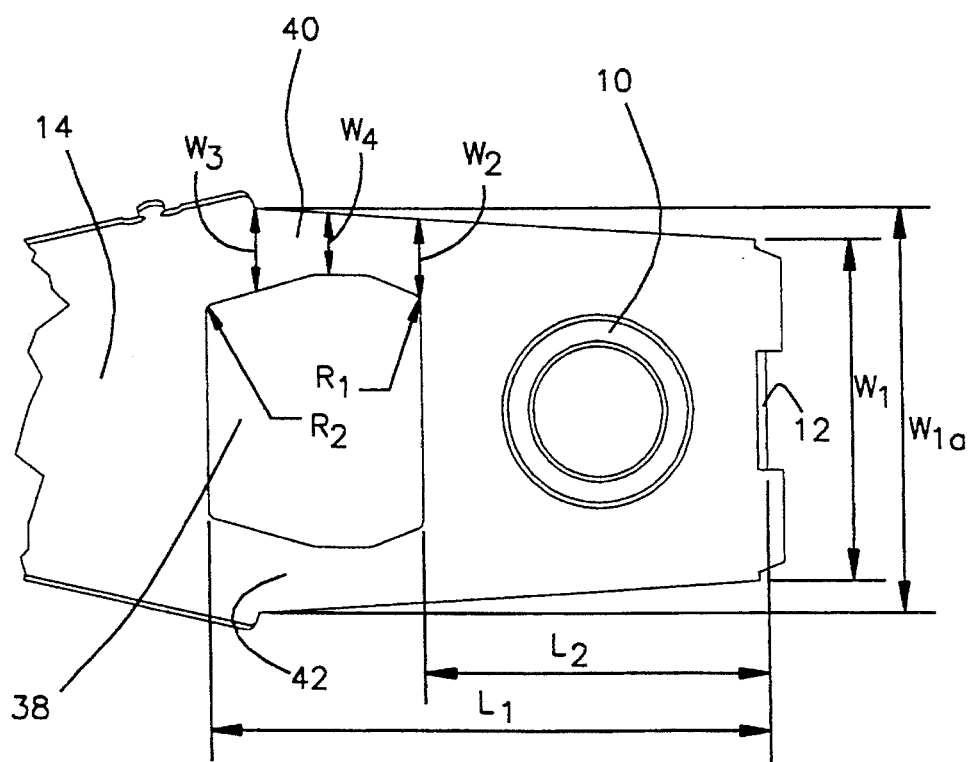
FIG. 4 is a first embodiment of the invention in which the width of each leg varies along its length, from a narrow width proximal to the actuator arm, to a widest width distal to the actuator arm, with a narrowest width portion intermediate between the two ends. The area of reduced thickness is formed by completely removing original load beam material.

FIG. 4 illustrates a first embodiment of a suspension constructed in accordance with the present invention. Generally, octagonal cutout 38 is provided in the region between the proximal terminus of the load beam in the vicinity of base plate 12 and boss 10, as is the case in the prior art assemblies, but, in the first embodiment shown, the width of separate load beam springs 40, 42 is not constant, as was the case in the prior art embodiments shown in FIGS. 2 and 3. As shown in FIG. 4, the width of each load beam spring 40, 42 increases from a first width $W_2$ near the proximal end of load beam 14 to a widest width $W_3$ near the distal end of the resilient spring region of load beam 14 with a narrowest width $W_4$ in an area between the ends of load beam springs 40, 42.

Figure 5:
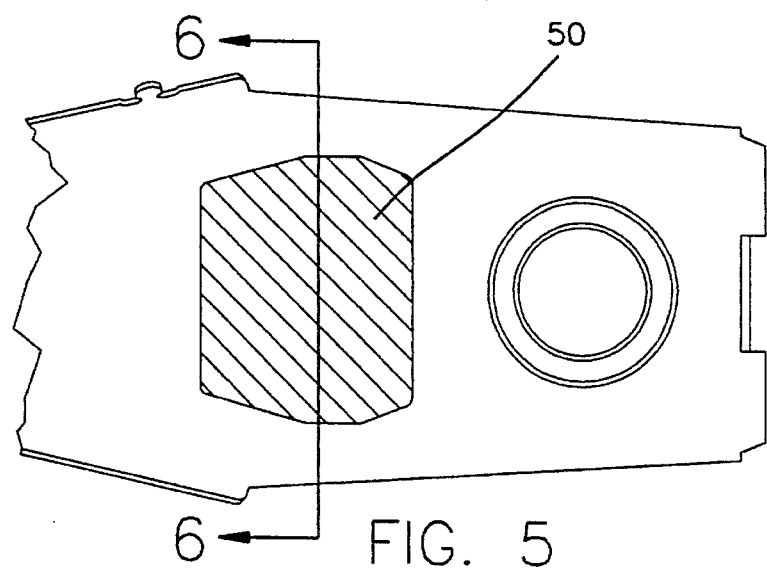
FIG. 5 is a second embodiment of the invention in which an area of reduced thickness is formed in the spring region.
Figures 6A, 6B:
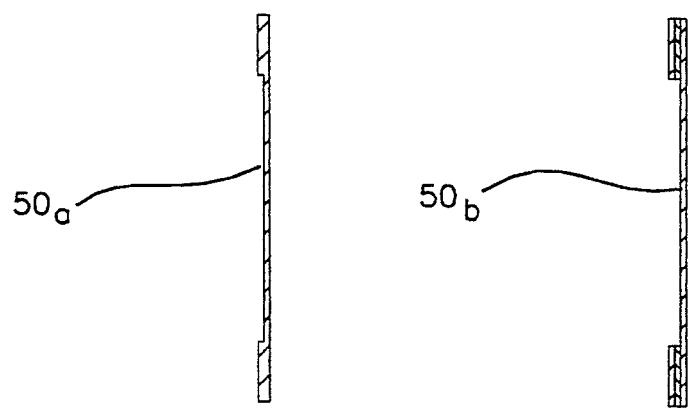
FIG. 6A is a profile view taken along line 6—6 in FIG. 5, and the area of reduced thickness is formed by partially reducing the thickness of the original load beam material.
FIG. 6B is a profile view taken along line 6—6 in FIG. 5, and the area of reduced thickness is formed by using fewer lamina than are used in forming the laminate of the original load beam material.
Figure 7:
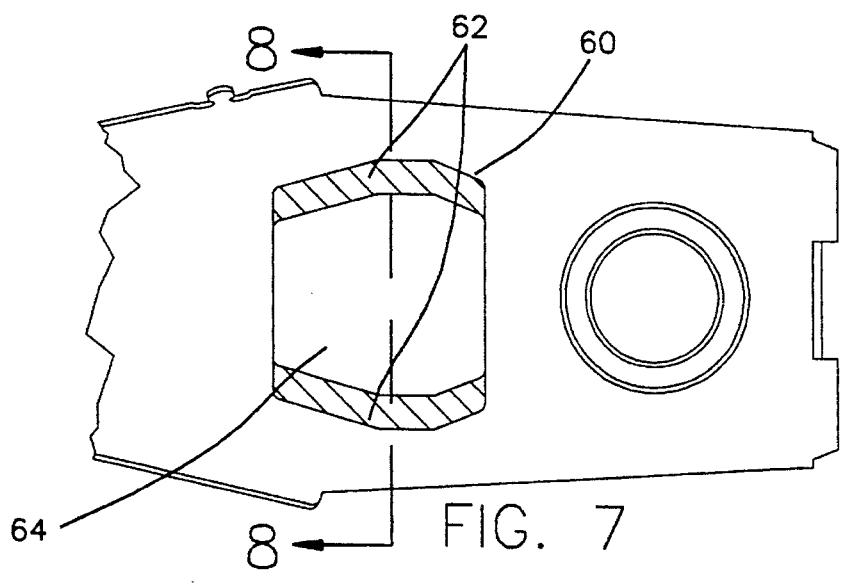
FIG. 7 is a third embodiment of the invention in which the area of reduced thickness is formed by partially reducing the thickness of the original load beam material along the perimeter of each beam and completely removing original load beam material in the remainder of the area.
Figures 8A, 8B:
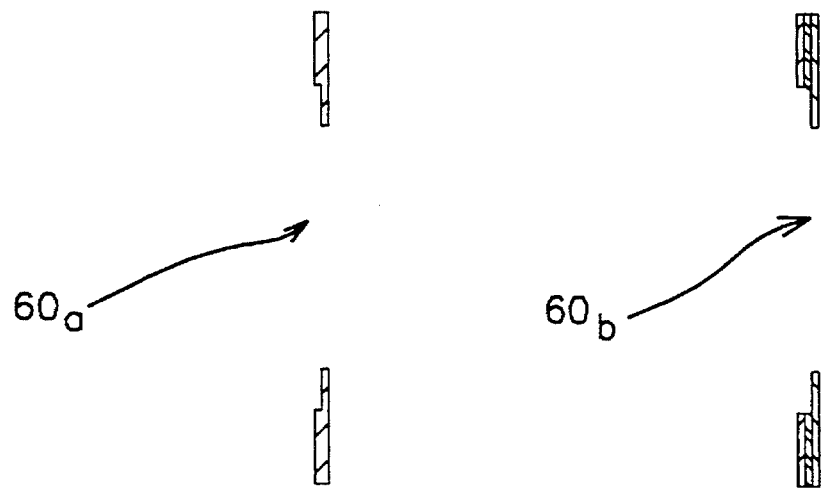
FIG. 8A is a profile view taken along line 8—8 in FIG. 7, and the area of reduced thickness is formed by partially reducing the thickness of the original load beam material.
FIG. 8B is a profile view taken along line 8—8 in FIG. 7, and the area of reduced thickness is formed by using fewer lamina than are used in forming the laminate of the original load beam material.

FIGS. 5 and 6 illustrate second and third embodiments of suspensions constructed in accordance with the present invention. Generally, area of reduced thickness 50, illustrated in FIG. 5, and area of varying thickness 60, illustrate in FIG. 6, are each shaped and sized similarly to cut-out 38, except that material in areas 50 and 60 is only partially removed, rather than completely removed. Thus, area of reduced thickness 50 is formed by removing a uniform thickness of load beam material therefrom. As seen in the profile views shown in FIGS. 6A and 6B, reduced thickness may be formed by partially etching load beam material in area 50a (FIG. 6A) or by removing laminate material in area 50b (FIG. 6B). Also, area of varying thickness 60 is formed by removing varying thicknesses of load beam material therefrom, so that bands 62 of reduced load beam material border area 60 and frame cut-out 64. As can be seen in the profile views of FIGS. 8A and 8B, bands 62 may be formed by partially etching load beam material in area 60a (FIG. 8A) or by removing laminate material in area 60b (FIG. 8B).

Figure 9:
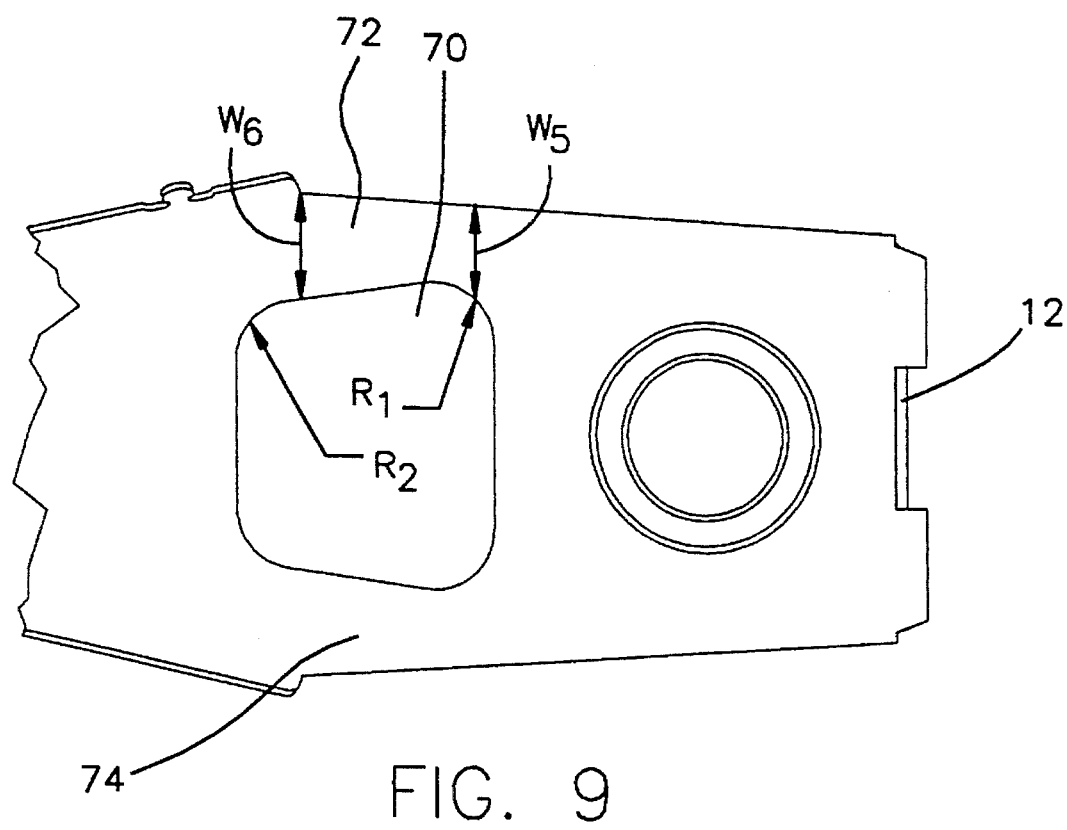
FIG. 9 is a fourth embodiment of the invention in which the width of each leg varies along its length, from narrowest proximal to the actuator arm, to widest distal to the actuator arm. The area of reduced thickness is a trapezoid formed by completely removing original load beam material.

FIG. 9 illustrates a fourth embodiment of a suspension constructed in accordance with the present invention. Generally, trapezoidal cut-out 70 is provided in the spring region at the proximal terminus of the load beam, but the width of separate load beam springs 72, 74 is not constant. The width of each load beam spring 72, 74 increases from narrowest width $W_5$ near the proximal end of the load beam to widest width $W_6$ near the distal end of the resilient spring region of the load beam. It will be obvious that trapezoidal cut-out 70 may also be formed in the same manner as has been described above with reference to area of reduced thickness 50 and area of varying thickness 60.

In addition to the tapered widths of load beam springs 40, 42 between $W_2$, $W_3$ and $W_4$, and of load beam springs 72, 74 between $W_5$ and $W_6$, the transitions between the each of these beam springs and the body of the load beam are all gentle transitions, having radii $R_1$ and $R_2$. While the prior art devices, such as shown in FIGS. 2 and 3 tended to have radii of 0.005 inches for the corners of the cutout, we have found in developing and testing the present embodiments that the radius of $R_1$ should be in a range of 0.025 through 0.060 inches, while the radius of $R_2$ should be in a range of 0.025 through 0.050 inches.

In the embodiment shown in FIG. 4, the width $W_1$ is preferably about 0.200 inches. The width $W_{1a}$, is preferably about 0.250 inches. The distance from the distal extremity of base plate 12 to the distal side of cutout 38, $L_1$ is generally about 0.200 inches, while the distance from that same distal extremity to the other major side of cutout 38, $L_2$, is generally about 0.328 inches.

Each individual load beam spring for all embodiments preferably has an approximate width at the distal end of 0.065 inches, an approximate width of 0.060 inches at the proximal end (for the embodiments shown in FIGS. 4–9), and an approximate width of 0.050 inches in the middle portion (for the embodiments shown in FIGS. 4–8).

It is to be understood that, alternatively, the load beam and flexure piece according to the present invention may be formed as a one-piece integral unit. It is also to be understood that needed stiffness may be provided to the load beam by other types of stiffening members, such as are shown in commonly assigned, application Ser. No. 08/001,168, filed Jan. 7, 1993, entitled INTERIOR STIFFENING AND HEAD LIFTER RAILS, abandoned in favor of Ser. No. 08/359,935, filed Dec. 20, 1994.

What is claimed is:

1. A magnetic head suspension for attachment to a rigid arm, said head suspension comprising, in combination:

(a) a load beam formed from material having a first thickness joined to the arm at a load beam proximal end, said load beam having a substantially resilient spring region at its proximal end and a substantially rigid region for its remaining length, the load beam having a central portion having a second thickness in the spring region thereof, such that the second thickness is generally less than the first thickness, the central portion being bounded by a pair of first thickness supporting legs oriented along perimeter edges of the spring region, such that each leg has a first width at a proximal end thereof adjacent the actuator arm and a second width at a distal end thereof, such that the second width is generally greater than the first width, wherein the first thickness is comprised of a first number of laminar sheets and the second thickness is comprised of a second number of laminar sheets, said second number being equal to or greater than 1 and different from said first number; and (b) flexure means adjacent a load beam distal end for supporting a read/write head mounted thereon.

2. A magnetic head suspension for attachment to a rigid arm, said head suspension comprising, in combination:

(a) a load beam formed from material having a first thickness joined to the arm at a load beam proximal end, said load beam having a substantially resilient spring region at its proximal end and a substantially rigid region for its remaining length, the load beam having a central portion having a second thickness in a spring region thereof, the central portion having a generally trapezoidal cross section with this parallel sides oriented perpendicular to a load beam longitudinal axis, said trapezoidal central region being oriented to define a pair of supporting legs, each leg having a first width at a central region end proximal to the substantially rigid region of the load beam and each leg having a second width at an end of said central region distal to the substantially rigid region of the load beam, inner edges of said legs defining non-parallel sides of the trapezoidal central portion, such that the second thickness is generally less than the first thickness and such that the second width is generally less than the first width, wherein the first thickness is comprised of a first number of laminar sheets and the second thickness is comprised of a second number of laminar sheets, said second number being equal to or greater than 1 and different from said first number; and (b) flexure means adjacent the load beam distal end for supporting a read/write head mounted thereon.

* * * * *